Jan. 22, 1929.  E. W. TEMPLIN  1,700,090
SHEET METAL VEHICLE BODY
Filed April 21, 1925  6 Sheets-Sheet 1
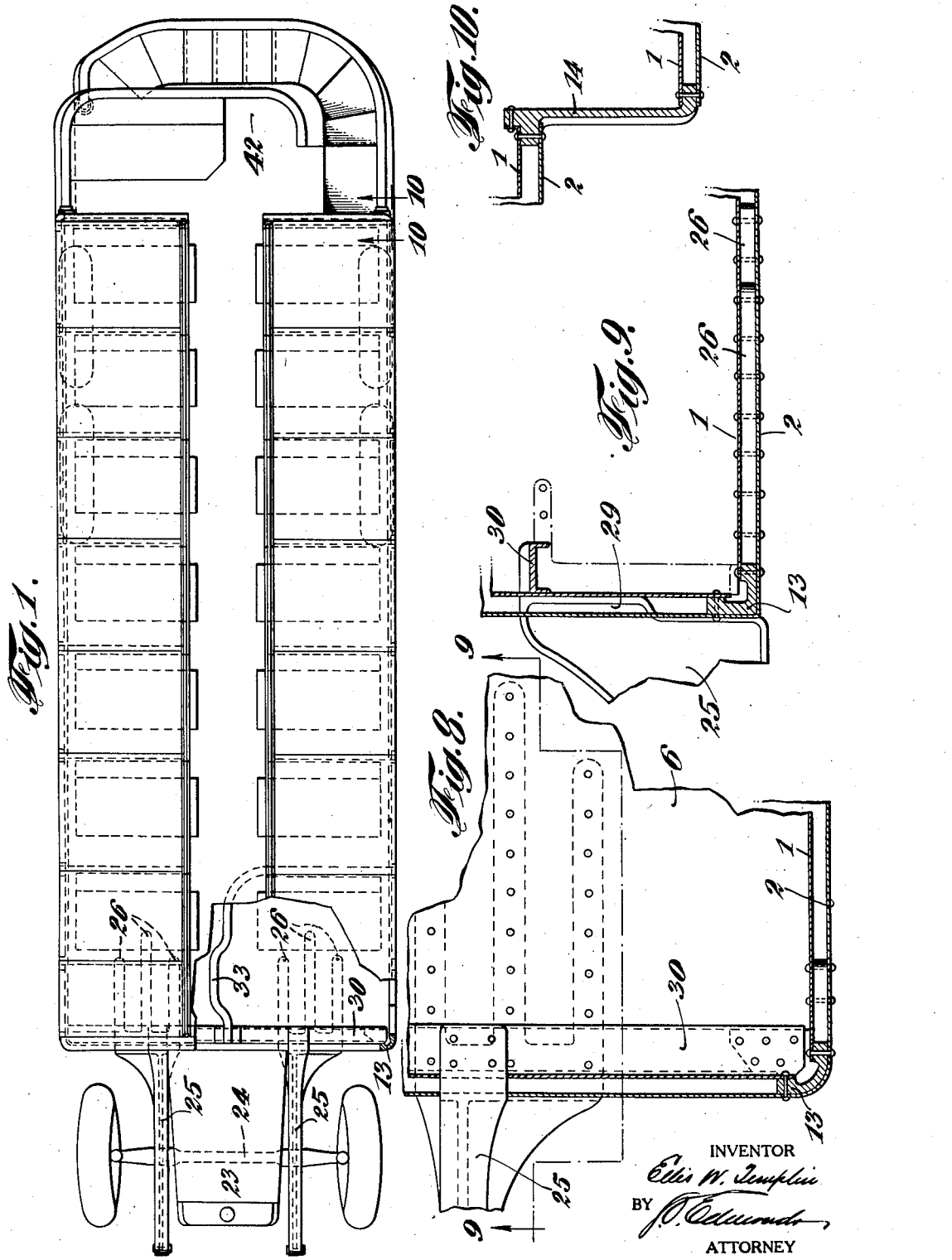

Jan. 22, 1929.
E. W. TEMPLIN
1,700,090
SHEET METAL VEHICLE BODY
Filed April 21, 1925    6 Sheets-Sheet 2
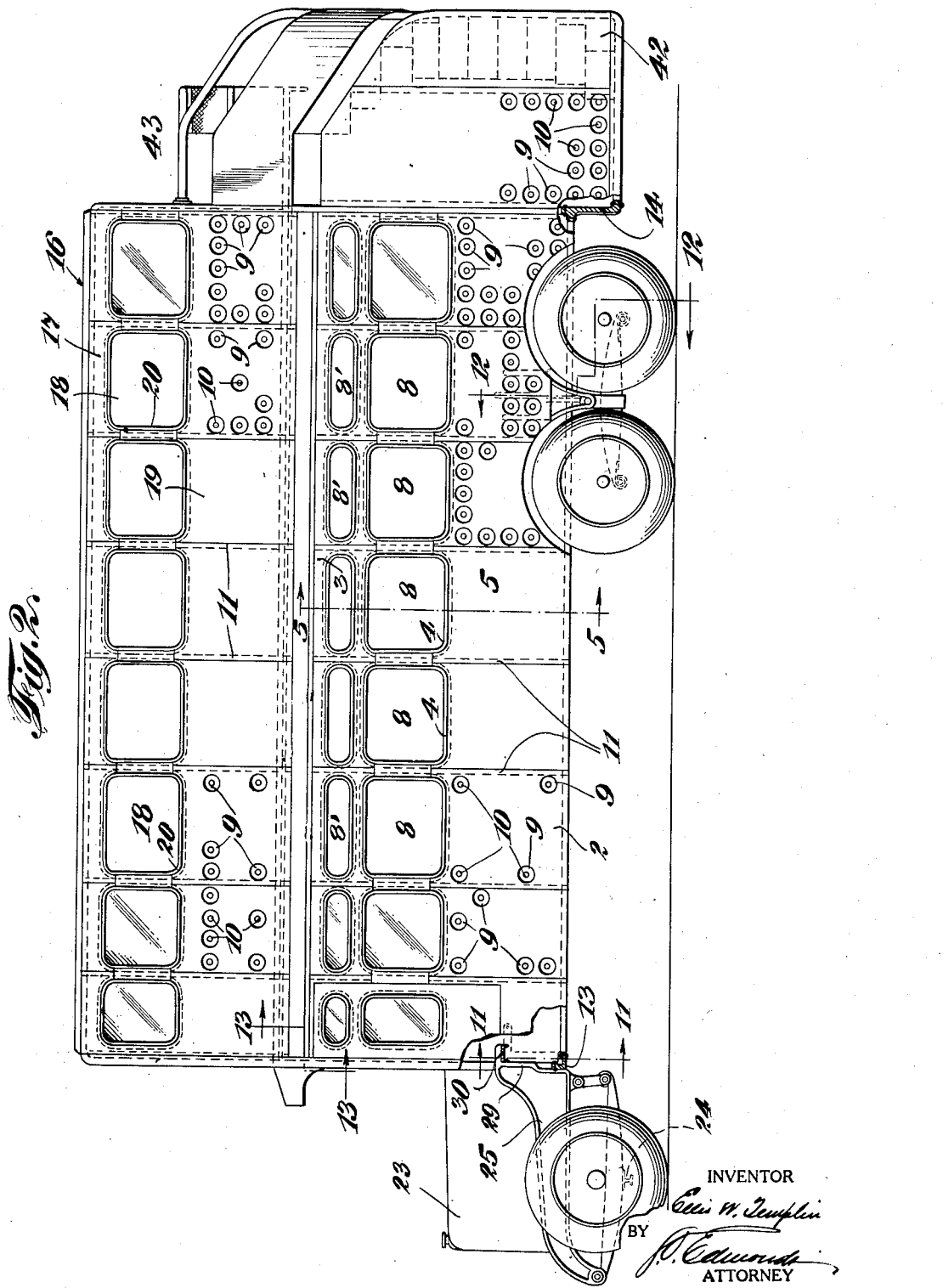

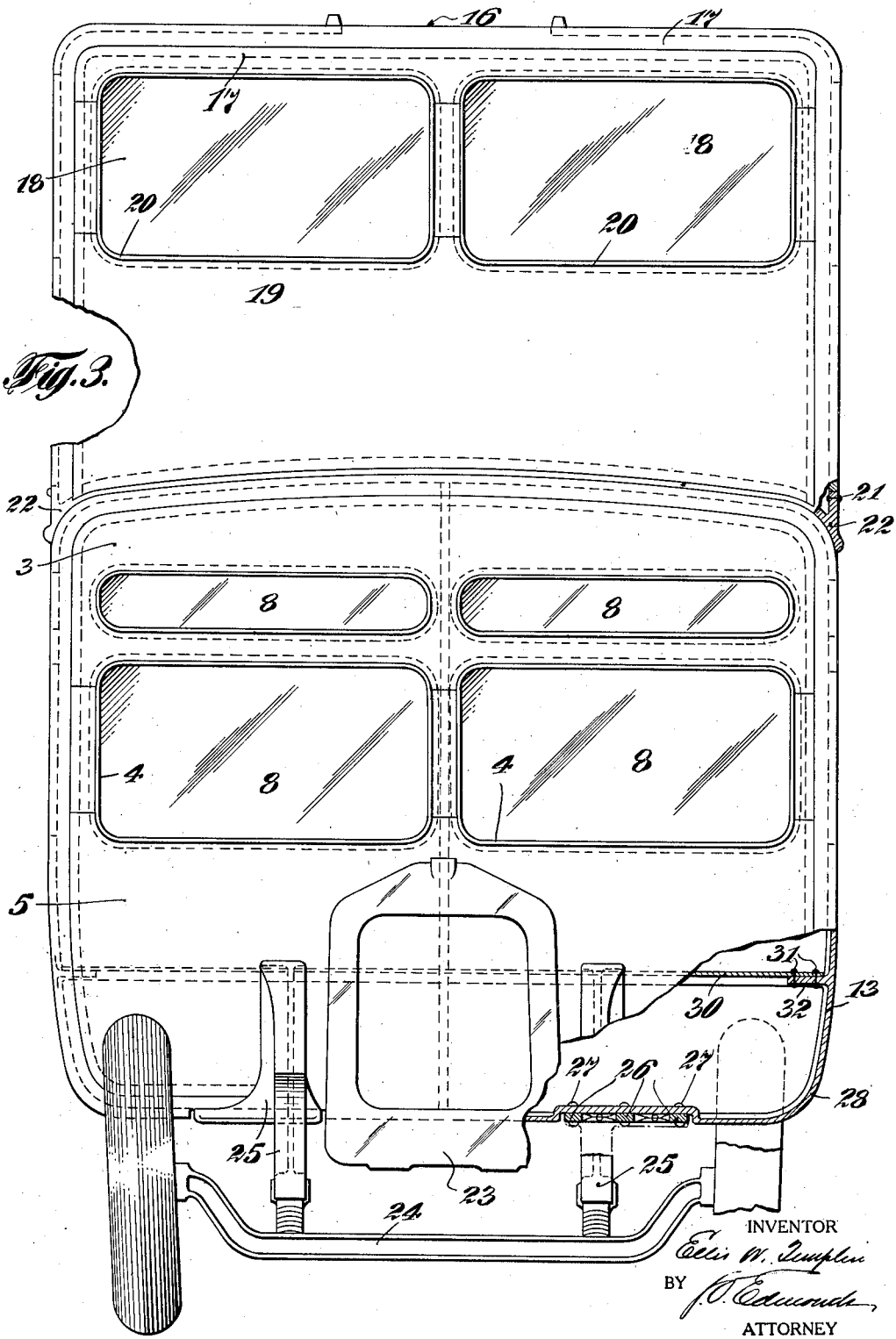

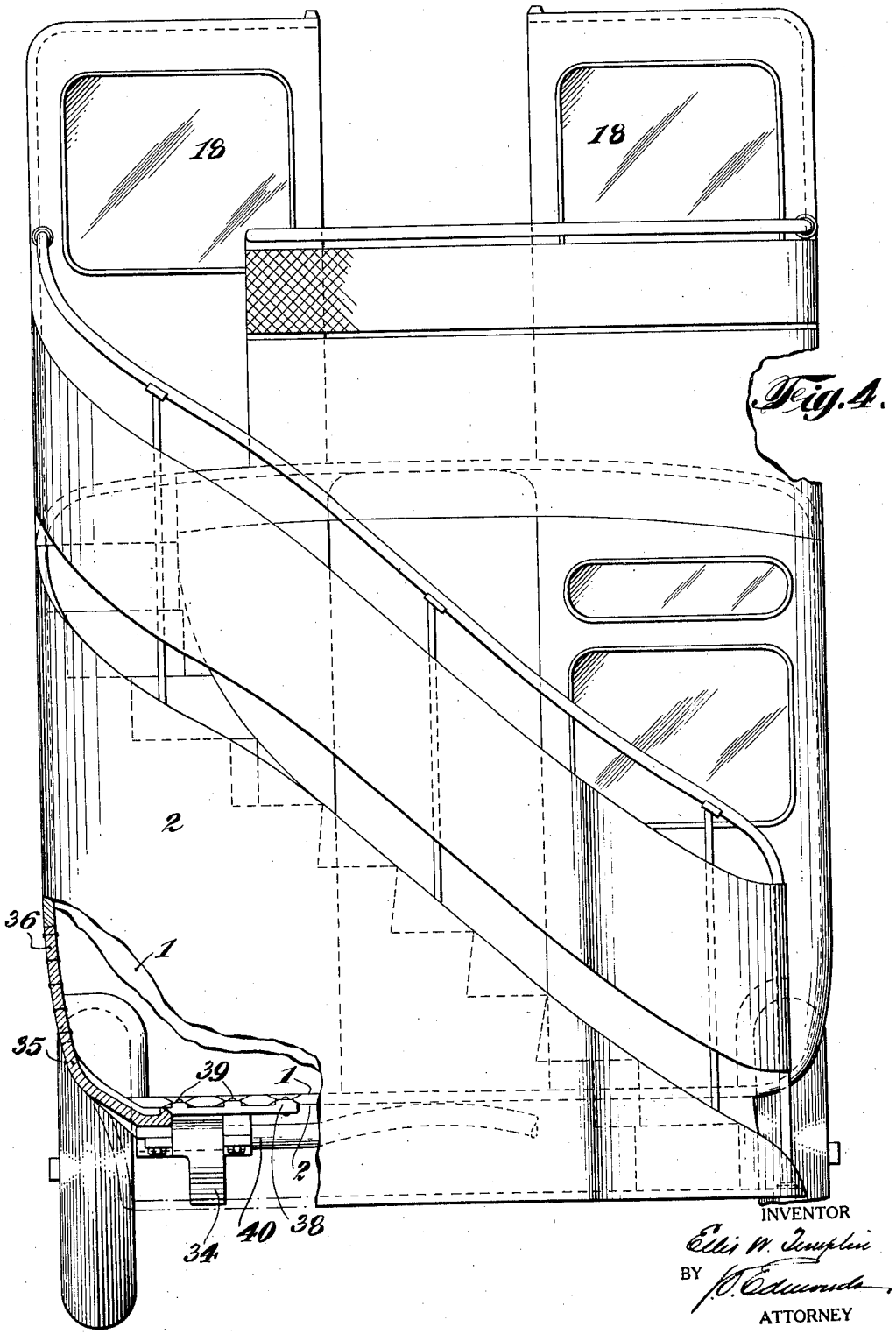

Jan. 22, 1929.
E. W. TEMPLIN
1,700,090
SHEET METAL VEHICLE BODY
Filed April 21, 1925   6 Sheets-Sheet 5
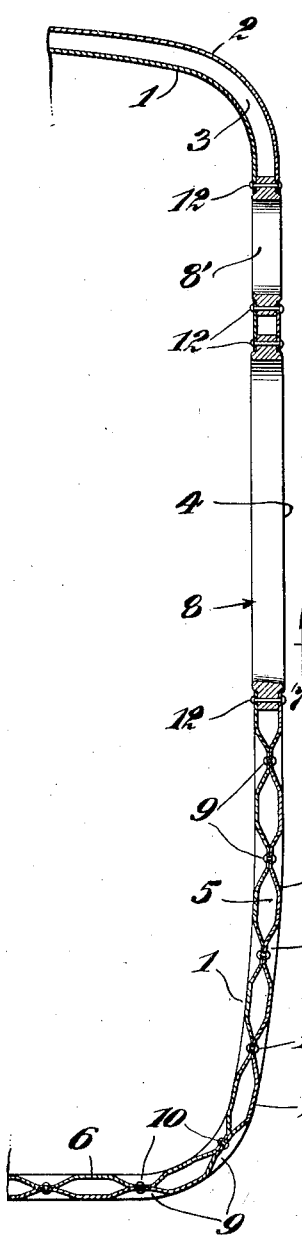
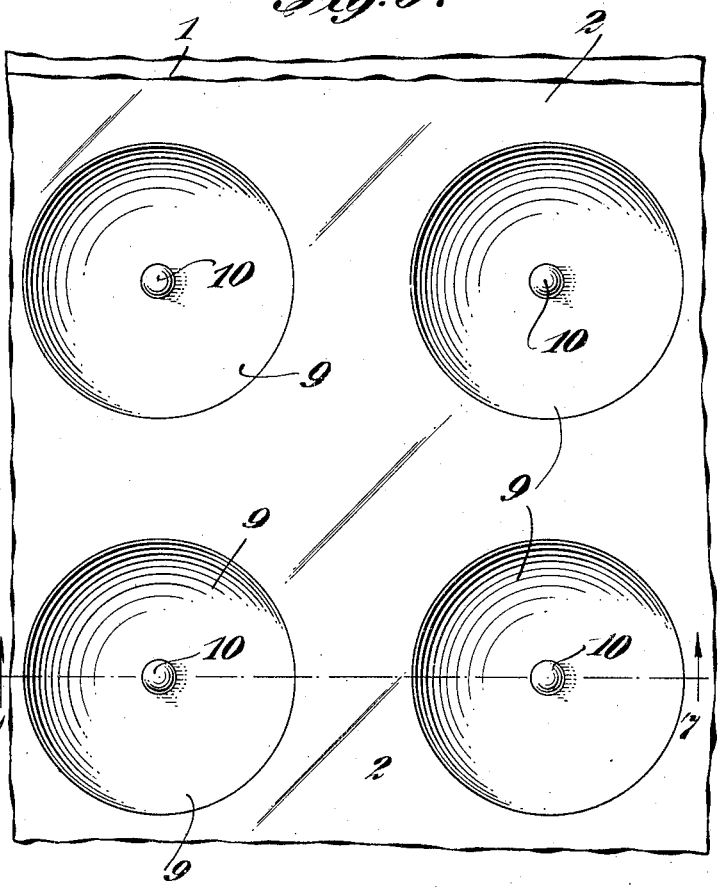
INVENTOR
Ellis W. Templin
BY
ATTORNEY

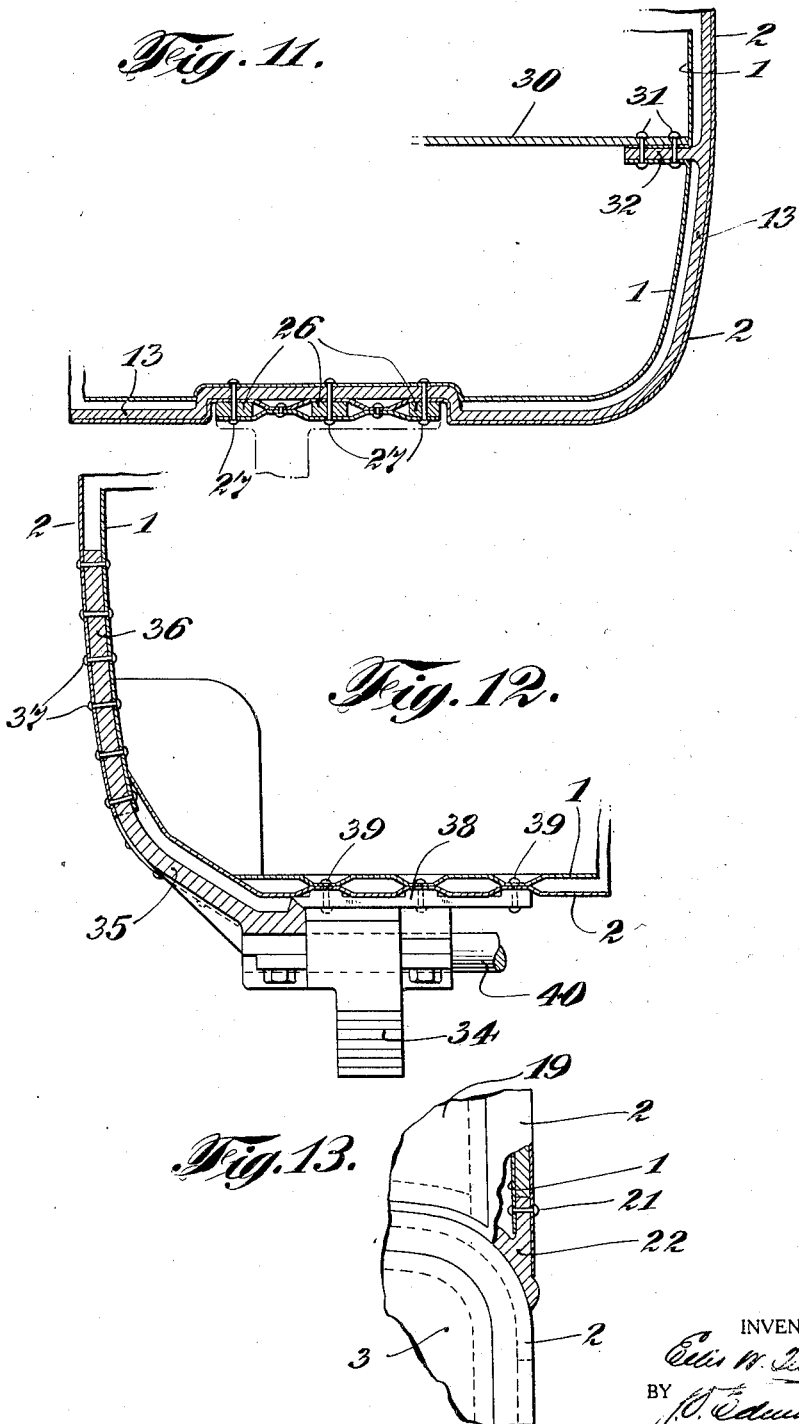

Patented Jan. 22, 1929.

1,700,090

UNITED STATES PATENT OFFICE.

ELLIS W. TEMPLIN, OF UPPER DARBY, PENNSYLVANIA, ASSIGNOR TO THE AMERICAN MOTOR BODY CORPORATION, OF PHILADELPHIA, PENNSYLVANIA, A CORPORATION OF DELAWARE.

SHEET-METAL VEHICLE BODY.

Application filed April 21, 1925. Serial No. 24,721.

This invention relates to vehicle bodies, and more particularly relates to sheet metal bus bodies for automotive vehicles.

Heretofore it has been customary in automotive vehicles to provide a chassis and a body which is separate from the chassis and is mounted thereon. The power plant, the front and rear axle assemblies and other units, such as brake controls, etc., have been mounted on the chassis.

One of the principal objects of my invention is to reduce the weight of the construction, particularly when applied to a motor bus body, and a construction which provides greater carrying capacity in proportion to the power of the engine. Another object of my invention is to provide a light sheet metal construction functioning both as a body and as a support for the power plant of the vehicle, the front and rear axle assemblies and other units, such as brake controls, etc., and at the same time is sufficiently strong to withstand all stresses and strains of traveling and load and road conditions. A further object of my invention is to provide a construction of the above character which is applicable to either single or double deck bus bodies or to commercial vehicles of various types.

In carrying out my invention, one of the main features is the elimination of the chassis frame as such, and the mounting of all the units, such as the power plant, front and rear axle assemblies, brake controls, etc. direct to a trussed sheet metal formation which serves as the body and floor of the vehicle. I have found that by forming the body of suitably trussed sheet metal that the construction is sufficiently strong and rigid to support all the above units, which have been usually mounted on a separate chassis frame, and the chassis frame is no longer necessary and may be eliminated. These units, including the power plant and the various other units usually carried by the chassis frame, may be secured suitably to such sheet metal construction at the desired locations by means of suitable arms or brackets, or other suitable attachment members. One form of trussed sheet metal construction which has been found satisfactory comprises the structure disclosed in patent to John O. Madison, No. 1,277,622, dated September 3, 1918. It is to be understood, however, that my invention is not limited to any specific form of trussed sheet metal, nor to any specific means of mounting the said units thereon.

In order that a clearer understanding of my invention may be had, attention is hereby directed to the accompanying drawings forming a part of this application and illustrating certain possible embodiments of my invention. Referring to the drawings, Fig. 1 is a top view of a double deck bus body embodying my invention, a portion of the top at the front being broken away to more clearly bring out certain of the features; Fig. 2 is a side view of the same with certain portions broken away; Fig. 3 is a front view of the same with certain portions broken away; Fig. 4 is a rear view of the same with certain portions broken away; Fig. 5 is an enlarged vertical sectional view taken on the line 5—5 of Fig. 2, the upper deck being removed; Fig. 6 is an enlarged plan view of a fragment of the trussed sheet metal incorporated in the construction; Fig. 7 is a sectional view of the same and is taken on the line 7—7 of Fig. 6; Fig. 8 is an enlarged horizontal sectional view showing a detail of the construction at a front corner thereof; Fig. 9 is a sectional view taken on the line 9—9 of Fig. 8; Fig. 10 is an enlarged vertical sectional view of a fragment of the construction at a rear corner thereof, and is taken on the line 10—10 of Fig. 1; Fig. 11 is an enlarged vertical section of a portion of the construction, and is taken on the line 11—11 of Fig. 2; Fig. 12 is an enlarged sectional view of a portion of the construction, and is taken on the line 12—12 of Fig. 2; and Fig. 13 is an enlarged view of a portion of the construction, partly in section, and is taken on the line 13—13 of Fig. 2. Similar reference characters refer to similar parts throughout the several views of the drawings.

Referring to the drawings, when a single deck body is desired, it may comprise, in the main, of an inner sheet metal shell 1 and an outer sheet metal shell 2. These shells may be in two sections. The upper section 3 forms the tops and sides of the body above the windows 4 and the lower section 5 forms the floor 6 and the sides 7 of the body below the windows. These two sections 3 and 5 may be fastened together by castings 8 which form the window frames, whereby the two sections are joined together to form the complete top, sides and bottom of the body, and also the back and front, if desired.

Each of the shells 1 and 2 are preferably made up from sheets of metal that have been formed with depressions 9. The shells are then placed together with the depressed surfaces adjacent each other and there spot-welded or riveted together, as at 10. It is not necessary to make the top, bottom and sides of the body of integral sheets, since they may be formed of separate sheets which abut each other and are welded or riveted together at their overlapping edges, as along the lines 11 in Fig. 2. The window frame castings 8 and 8' are peripherally shaped to seat between the ends of the inner shell 1 and the outer shell 2 and may be welded or riveted thereto, as at 12. Preferably, the front ends of these shells 1 and 2 are fastened to a suitable casting 13 which supports the front bulk head, and the rear ends of these shells are fastened to a suitable casting 14 which supports the rear bulk head and rear platform. These shells after assembly will be so strong that a chassis frame will not be necessary to support these elements and the chassis frame accordingly may be eliminated.

When a double deck bus body is desired, an upper deck portion is constructed which is adapted to be placed directly on top of the lower deck construction in such a way that the roof of the lower deck portion serves as the floor for the upper deck. Such upper deck portion may be constructed of trussed sheet metal of the character above described and may be assembled in substantially the same manner. The upper deck body has a trussed sheet metal section which forms the top 16 and the sides 17 above the windows 18 and a lower section 19 forming the sides below the windows. These two sections 17 and 19 may be fastened together by being riveted to castings 20 which form the window frames. The lower edge of the lower section may be welded or riveted, as at 21, to a horizontal casting 22 which fits on the top edge of the lower deck body, and whereby the upper deck body may be fastened to the lower deck body rigidly and securely.

The power plant 23 and front axle assembly 24 are mounted on two arms or brackets 25 which project from the front end of the body. A plurality of horizontal finger portions 26 at the rear of these brackets are inserted into the floor of the body between the inner shell 1 and the outer shell 2 for a considerable distance and are fastened to these shells by welding or riveting, as at 27. These brackets are also fastened to a suitable casting 13 which extends across the lower front edge of the body and upwardly along the side edges. The edges of the adjacent inner and outer shell portion are welded or riveted to this U-shaped casting. In addition to the above fastening, in order to take care of the stress caused by the long overhang, as well as body load, the brackets 25 have portions 29 extending upwardly along the front of the body for a considerable distance, and at their upper edge are fastened to a channel shaped cross member 30 which extends the full width of the body and is fastened at each end, as by rivets 31, to a shoulder 32 formed on the casting 13. This cross member 30 is also fastened at the center to a vertical partition member 33 which extends rearwardly for a distance and then curves toward one side of the body and forms a compartment for the driver of the vehicle.

The rear axle assembly 34 is mounted on the body by means of brackets 35, one of which is at each side of the body. Each bracket has upwardly extending finger portions 36 which extend upwardly between the inner shell 1 and the outer shell 2 for a considerable distance, and to which shells these fingers are secured by welding or riveting, as at 37. These brackets also have portions 38 extending beneath the floor of the body, and to which these portions are fastened by welding or riveting, as at 39. Preferably, a torque tube 40 extends across the body and is secured to the two brackets 35. This makes a very rigid construction.

Along the lower rear edge of the body there may be incorporated a casting 14 adapted to aid in supporting the rear platform 42 and the stairs 43 leading to the upper deck.

Preferably, the floor of the body is covered with a composition that will fill up all depressions, and linoleum or the like may be laid thereover, if desired.

The outside of the body may be covered with a light fabric, thereby covering all depressions and making a smooth surface for painting.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It now will be readily apparent that the above described body involves several new and useful features in body construction. One of the main features is the elimination of the chassis frame and the mounting direct to and on the body of all units which heretofore usually have been mounted on a separate chassis. This feature alone greatly reduces the weight of the bus and allows a greater carrying capacity without increasing the size of the power plant. The trussed material may comprise sheet steel or lighter material, such as aluminum, preferably aluminum. The construction is such that a thin gage of metal can be used and will be sufficiently strong to take care of all stresses and strains caused by road conditions and usage. These novel features may be applied to bodies of different types, such as single or double deck bus bodies, commercial bodies, and many other types of bodies.

What I claim is:—

1. A chassisless vehicle including metal body and running gear supporting sections comprising inner and outer metal walls, one wall having circular reenforcing depressions, said walls being secured together at said depressions forming a truss construction, said sections forming continuous side and bottom portions of the vehicle body, brackets secured to said sections intermediate the walls thereof, and running gear units secured on said brackets.

2. In vehicle construction of the character described, in combination, a front body portion of trussed sheet metal, brackets secured to said front and having portions extending forwardly thereof, and a power plant and a front axle assembly supported on the forward extending portion of said brackets.

3. In vehicle construction of the character described, in combination, a front body portion of trussed sheet metal, including an inner shell and an outer shell, brackets having portions disposed between and secured to said shells and extending forwardly of said front body portion, and a running gear unit supported on said brackets.

4. In vehicle construction of the character described, in combination, a front body portion of trussed sheet metal, including an inner shell and an outer shell, brackets having portions disposed between and secured to said shells and extending forwardly of said front body portion, and a running gear unit supported on said brackets, said brackets having upwardly extending portions disposed against and secured to said sheet metal front.

5. In vehicle construction of the character described, in combination, a front body portion of trussed sheet metal, including an inner shell and an outer shell, brackets having portions disposed between and secured to said shells and extending forwardly of said front body portion, and a running gear unit supported on said brackets, a horizontal reenforcing member extending across and secured to the lower edge of said sheet metal front, and said brackets being secured also to said reenforcing member.

6. Vehicle body construction of the character described, comprising a front body portion of trussed sheet metal, including an inner shell and an outer shell, a U-shaped reenforcing member extending across the lower edge and upwardly along the front corners of said sheet metal front and secured thereto, another reenforcing member extending horizontally between and secured at its ends to the upwardly extending portions of said U-shaped member above the bottom of said sheet metal front, brackets having horizontal portions disposed between said shells and secured thereto and having vertical portions extending upwardly along the front of said sheet metal front and secured thereto, said brackets being secured to both said reenforcing members, and a running gear unit mounted on said brackets.

7. In vehicle construction of the character described, the combination with bottom and side body portions built up of trussed sheet metal, including an inner shell and an outer shell, of a bracket on each side of the vehicle, said brackets having finger portions inserted between and secured within said inner and outer shells, and a running gear unit extending between and supported by said brackets.

8. In vehicle construction of the character described, the combination with bottom and side body portions built up of trussed sheet metal, including an inner shell and an outer shell, of a bracket on each side of the vehicle and secured to said sheet metal, a running gear unit extending between and supported from said brackets, and a torque tube extending between and secured at each end to said brackets.

9. In vehicle construction of the character described, the combination with bottom and side body portions built up of trussed sheet metal, including an inner shell and an outer shell, of a bracket on each side of the vehicle and secured to said sheet metal, and a running gear unit extending between and supported by said brackets, each of said brackets having a vertical portion disposed between and secured to said shells at the side body portions.

10. In vehicle construction of the character described, the combination with bottom and side body portions built up of trussed sheet metal, including an inner shell and an outer shell, of a bracket on each side of the vehicle and secured to said sheet metal, and a rear axle unit extending between and supported by said brackets, each of said brackets having a vertical portion disposed between and secured to said shells at the side body portions, and having a horizontal portion abutting and secured to the bottom body portion.

11. In vehicle construction of the character described, a body including an upper section of trussed sheet metal forming the roof and sides above the windows, a lower section of trussed sheet metal forming the bottom and sides below the windows, window frame castings, said body sections being secured to said castings, and an upper deck section resting on and secured to said upper body section.

12. In vehicle body construction of the character described, the combination with front and bottom body portions built of trussed sheet steel, of a pair of brackets secured to and projecting forwardly of said front and bottom body portions, and a power unit supported between said brackets and beyond said front and bottom body portions.

13. In vehicle body construction of the character described, the combination with front and bottom body portions, said front portion having a horizontal bar secured to and extending substantially the breadth thereof, of a pair of brackets secured to said horizontal bar and said bottom body portion adapted to support the vehicle motivating unit.

14. In vehicle body construction of the character described, in combination, a body of trussed sheet metal having continuous side and bottom portions, a rear platform disposed below said bottom body portion, and a flanged sill member secured to and supported by said bottom body portion independent of longitudinal framework, said sill member supporting the platform.

15. In vehicle construction of the character described, in combination, trussed sheet-metal including an inner shell and an outer shell forming the body of the vehicle, supporting brackets extending therefrom, and running gear units supported on said brackets, said brackets having a plurality of finger elements secured to said shells and radiating in different directions therebetween to distribute the strain from said gear units through the vehicle body.

16. In vehicle construction of the character described, in combination, a body of trussed sheet-metal having a front wall and a bottom wall, brackets having a horizontal portion secured to said bottom wall and a vertical portion secured to the front wall, and a front axle assembly supported on said brackets.

17. Vehicle body construction of the character described, comprising a front body portion of trussed sheet-metal, including an inner shell and an outer shell, a U-shaped reinforcing member extending across the lower edge and upwardly along the front corners of said sheet-metal front and secured thereto, and another reinforcing member extending horizontally between and secured at its ends to the upwardly extending portions of said U-shaped member above the bottom of said sheet-metal front.

18. In vehicle construction of the character described, a body including an upper section of trussed sheet-metal forming the roof and sides above the windows, a lower section of trussed sheet-metal forming the bottom and sides below the windows, and window frame castings disposed between and secured to said body sections.

This specification signed this 15th day of April, 1925.

ELLIS W. TEMPLIN.